Oct. 10, 1950     R. M. JOLLY     2,525,489
CONTROL SYSTEM
Filed Nov. 19, 1948
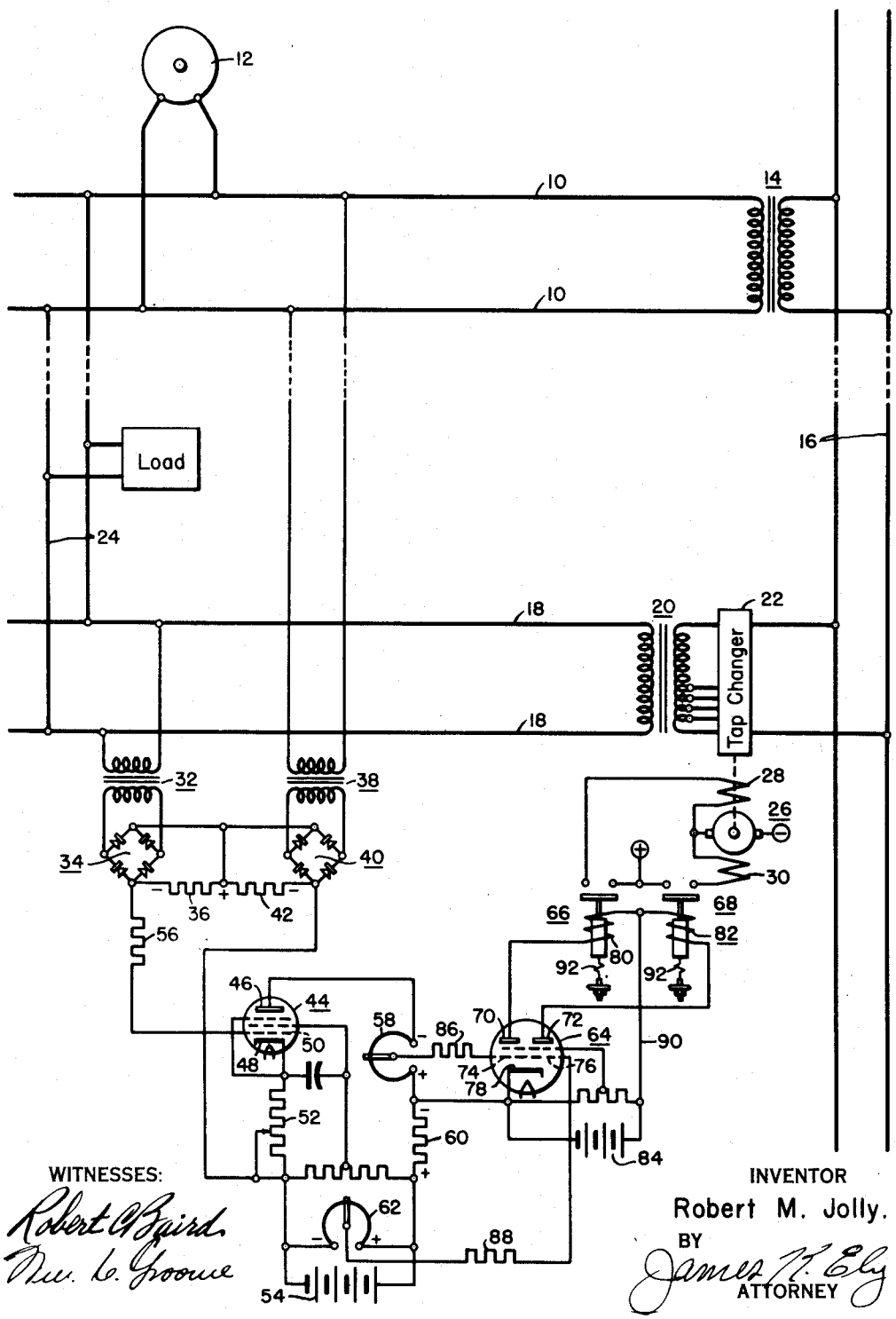
WITNESSES:
Robert A. Baird.
Nu. L. Groome
INVENTOR
Robert M. Jolly.
BY James N. Ely
ATTORNEY Patented Oct. 10, 1950

2,525,489

UNITED STATES PATENT OFFICE 2,525,489

CONTROL SYSTEM

Robert M. Jolly, Pittsburgh, Pa., assignor to Westinghouse Electric Corporation, East Pittsburgh, Pa., a corporation of Pennsylvania Application November 19, 1948, Serial No. 60,968

7 Claims. (Cl. 171—119)

1

This invention relates generally to electrical systems and in particular to control systems.

In power systems it is frequently necessary to tie or connect two power systems, one of which has large generating machines connected thereto, together. In such cases it is necessary to minimize the flow of reactive power through the tie line. Attempts have been made heretofore to prevent such flow of reactive power but these have not always been successful in that the intelligence required to operate suitable controls therefor has necessitated the use of large power circuits with a resulting drain on the power systems.

An object of this invention is to provide for minimizing or preventing the flow of reactive power in a tie line connected between two power systems.

Another object of this invention is the provision of an electronic control responsive to an unbalance of voltage between two power systems connected by a tie line for changing the input to one of the systems to equalize the voltage thereof and prevent or minimize the flow of reactive power in the tie line between the power systems.

Other objects of this invention will become apparent from the following description when taken in conjunction with the accompanying drawing, the single figure of which is a diagrammatic view of apparatus and circuits embodying the teachings of this invention.

Referring to the drawing there is illustrated a power system represented by conductors 10 disposed to supply electrical apparatus 12 and connected through a large capacity transformer 14 to be supplied from a power source represented by conductors 16. The power source 16 also supplies a power system represented by conductors 18 through a tapped transformer 20, the connections of which are disposed to be adjusted by a suitable tap changer represented by the rectangle 22. Both of the power systems 10 and 18 are disposed to be maintained at substantially the same voltage, a tie line 24 being connected therebetween.

In order to prevent or minimize the flow of reactive power through the tie line 24, it is necessary to adjust the connections of the tapped transformer 20 to maintain the voltage across conductors 18 at the same value as the voltage

2 across conductors 10. For this purpose a motor 26 is disposed to be directionally operated to actuate the tap changer 22 in a predetermined manner depending upon the selective energization of the field windings 28 and 30 of the motor 26.

In order to control the selective energization of the field windings 28 and 30, provision is made to obtain a pair of low ampere directcurrent voltages which constitute measures of the voltages across the pair of power systems. Thus a transformer 32 is connected across the power system 18 to supply a full wave dry type rectifier 34, the output terminals of which are connected across a resistor 36 whereby the voltage drop across resistor 36 constitutes a measure of the voltage across the power system 18. Similarly, a transformer 38 is connected across the power system 10 for supplying a full wave dry type rectifier 40, the output terminals of which are connected across a resistor 42 whereby the voltage drop across resistor 42 constitutes a measure of the voltage across the power system 10. As illustrated the resistors 36 and 42 are connected in series circuit relation but with the voltages thereacross in opposition whereby the voltage summation thereacross constitutes the differential of the two direct-current voltages and has a polarity depending upon which of the direct-current voltages is the larger.

In order to amplify the signal voltage which is the differential of the direct-current voltages appearing across the series connected resistors 36 and 42, a vacuum tube 44 is utilized. The vacuum tube 44 is of usual construction being provided with an anode 46, a cathode 48 and a control grid 50, the tube 44 being operated as a self-biased tube with a biasing resistor 52 being adjusted for a desired operating point, at which point current flows in the anode-cathode circuit from a source of supply represented by the battery 54. The bias of the control grid 50 is controlled by the voltage across the series connected resistors 36 and 42 which are connected in the grid-cathode circuit extending from the grid 50 through resistor 56, series connected resistors 36 and 42 and the self-biasing resistor 52 to the cathode 48.

The anode-cathode circuit of the tube 44 extends from the anode 46 through a potentiometer resistor 58, resistor 60, battery 54 across which a potentiometer resistor 62 is connected and the self-biasing resistor 52 to the cathode 48. From the current flow in the anode-cathode circuit of valve 44 by reason of the self-biasing of the tube, it is seen that the polarity of the voltages across resistors 58 and 60 are in opposition to the polarity of the voltage across the potentiometer resistor 62 which is connected across the battery 54.

As illustrated, a vacuum tube 64 is connected to control the selective energization of a pair of contactors 66 and 68 which control the selective energization of the field windings 28 and 30, respectively, of the motor 26. In this instance, the tube 64 comprises twin anodes 70 and 72, control grids 74 and 76 and a cathode 78 disposed for operation to selectively connect the energizing windings 80 and 82 of contactors 66 and 68, respectively, to a source of supply represented by the battery 84.

The control grid 74 is connected through resistor 86 and a part of the potentiometer resistor 58 to the cathode 78, whereas the grid 76 is connected through resistor 88, a part of potentiometer resistor 62, and resistor 60 to the cathode 78. In practice the potentiometers 58 and 62 are so adjusted when the tube 44 is operating as a self-biased tube, that the grids 74 and 76 are negatively biased to prevent either of the anode-cathode circuits of tube 64 from conducting. This will be appreciated when it is noted that the potentiometer 58 is connected to supply a negative bias to the grid 74 and that the resistor 60 and potentiometer 62 are connected in the biasing circuit of grid 76 whereby the resistor 60 supplies a positive bias and the potentiometer 62 supplies a negative bias.

In operation, with the potentiometer resistors 58 and 62 adjusted as described to cause a negative bias to be impressed upon the grids 74 and 76, respectively, if the voltage across the power system 10 should become high relative to that across the power system 18, then the differential of the opposed direct-current voltages across resistors 36 and 42 will be such as to apply a positive bias to the grid 50 to increase the conductivity of the tube 44. As the current flow in the anode-cathode circuit thereof increases, the voltage drop across the potentiometer resistor 58 increases whereby the negative bias applied to the grid 74 is increased to prevent the anode-cathode circuit of the tube 64 controlled thereby from conducting. At the same time the voltage drop across resistor 60 is increased whereby the resistor 60 will supply sufficient positive bias to the grid 76 in opposition to the negative bias of potentiometer 62 to render the anode-cathode circuit of tube 64 controlled thereby conducting. This circuit extends from the anode 72 through the energizing winding 82 of the contactor 68, conductor 90 and the battery 84 to the cathode 78.

When the contactor 68 is thus energized, it is actuated to establish the energizing circuit for the field winding 30 of the motor 26 to effect an operation of the motor in a direction to operate the tap changer 22 to change the connections of the transformer 20 to increase the voltage across the power system 18 to the value of the voltage across the power system 10.

If on the other hand the voltage across the power system 10 should decrease below the voltage across the power system 18, then the differential of the opposed direct current voltages across the series connected resistors 36 and 42 will be such as to apply a less positive bias to the grid 50 to decrease the conductivity of the tube 44. As the current flow in the anode-cathode circuit of tube 44 decreases the voltage drop across the potentiometer resistor 58 and across resistor 60 decreases. The bias applied to the grid 74 of the tube 64 thus becomes less negative and the anode-cathode circuit controlled thereby becomes conducting. At the same time, the decrease in the voltage drop across resistor 60 decreases the positive bias applied therefrom in opposition to the negative bias from the potentiometer 62 whereby the bias applied to the grid 76 of the tube 64 is so negative as to prevent the anode-cathode circuit controlled thereby from becoming conducting.

When the anode-cathode circuit controlled by the grid 74 becomes conducting, the winding 80 of the contactor 66 is energized, the energizing circuit thereof extending from the anode 70 through the winding 80, conductor 90 and the battery 84 to the cathode 78. When thus energized, the contactor 66 establishes the energizing circuit for the field winding 28 of the motor 26 to effect the operation thereof in a direction to drive the tap changer 22 to so change the connections of the transformer 20 as to decrease the voltage across the power system 10 to equal the voltage of the power system 10.

The control system described is very sensitive and is of particular value in maintaining the voltage of the two power systems substantially equal. The advantages of utilizing the low ampere direct-current voltage signals are apparent especially when it is considered that the power systems are usually separated by three or more miles. With this system telephone or other low power circuits can be utilized in transmitting the measures of the voltage of the power systems, the tube circuits being responsive to minute signals.

In practice, the contactors 66 and 68 have time delay characteristics, as indicated by the spring attachment 92 therefor whereby momentary fluctuations or differences in the voltages of the power systems will not effect an operation of the tap changing mechanism. If the differences between the voltages are sustained, then the system is effective to equalize the voltages and prevent the flow of reactive power in the tie line.

I claim as my invention:

1. In a system for limiting the flow of reactive power in a tie line connected between two power systems one of which is connected through a tap changing transformer to a high voltage power source, the combination comprising, means including low power conductors from the power systems for providing a pair of direct current control voltages constituting measure of the voltages of the two power systems, a vacuum tube having a conductivity dependent upon the differential of said pair of direct current control voltages, another tube having a pair of anode-cathode circuits disposed to be selectively rendered conducting depending upon the conductivity of said first tube, and means disposed to be selectively controlled in response to the selectively conducting pair of anode-cathode circuits to effect an operation of the tap changing transformer to adjust the voltage of the power system supplied thereby to correspond to the voltage of the other power system and prevent a flow of reactive power in the tie line therebetween.

2. In a system for limiting the flow of reactive power in a tie line connected between two power systems one of which is connected through a tap changing transformer to a high voltage power source, the combination comprising, means disposed for operation to control the operation of the tap changing transformer, a pair of control windings disposed to be selectively energized to control the operation of said means, a vacuum tube means disposed to connect the control windings to a source of energy, the vacuum tube means having twin anodes, grids and a cathode disposed for operation to selectively control the connecting of the pair of control windings, another tube means having an anode and cathode connected in circuit relation with the twin grids to control the bias thereof, a control grid for said another tube means, means including low power conductors from the power systems for providing a pair of opposed direct current voltages that are measures of the voltages of the two power systems, and means connecting the pair of opposed direct current voltages to the control grid of said another tube means whereby the control grid is biased in accordance with the differential of the pair of opposed direct current voltages.

3. In a system for limiting the flow of reactive power in a tie line connected between two power systems one of which is connected through a tap changing transformer to a high voltage power source, the combination comprising, means including low power conductors from the power systems for providing a pair of low ampere direct current control voltages constituting measures of the voltages of the two power systems, a first vacuum tube having a control grid, means for connecting the control grid to be biased in response to the differential of said pair of control voltages to control the conductivity of said first vacuum tube, another tube having twin anodes, grids and a cathode, means connected in circuit relation with the grids of said another tube and responsive to the conductivity of said first vacuum tube for selectively controlling the conductivity of the twin anode-cathode circuits of said another tube, and means disposed to be selectively controlled in response to the selective conductivity of the twin anode-cathode circuits to effect an operation of the tap changing transformer to adjust the voltage of the power system supplied thereby to correspond to the voltage of the other power system and prevent a flow of reactive power in the tie line therebetween.

4. In a system for limiting the flow of reactive power in a tie line connected between two power systems one of which is connected through a tap changing transformer to a high voltage power source, the combination comprising, means including low power conductors from the power systems for providing a pair of direct current control voltages constituting measures of the voltages of the two power systems, a vacuum tube having a conductivity dependent upon the differential of said pair of direct current control voltages, another tube having a pair of anode-cathode circuits disposed to be selectively rendered conducting depending upon the conductivity of said first tube, a pair of contactors disposed to be selectively operated depending upon the selective conductivity of the pair of anode-cathode circuits, and a motor disposed for directional operation in response to the selective operation of the contactors to directionally operate the tap changing transformer to adjust the voltage of the power system supplied thereby to correspond to the voltage of the other power system and prevent a flow of reactive power in the tie line therebetween.

5. In a system for limiting the flow of reactive power in a tie line connected between two power systems one of which is connected through a tap changing transformer to a high voltage power source, the combination comprising, means including low power conductors from the power systems for providing a pair of low ampere direct current control voltages constituting measures of the voltages of the two power systems, a first vacuum tube having a control grid, means for connecting the control grid to be biased in response to the differential of said pair of control voltages to control the conductivity of said first vacuum tube, another tube having twin anodes, grids and a cathode, means connected in circuit relation with the grids of said another tube and responsive to the conductivity of said first vacuum tube for selectively controlling the conductivity of the twin anode-cathode circuits of said another tube, a pair of contactors disposed to be selectively operated depending upon the selective conductivity of the twin anode-cathode circuits of said another tube, and means responsive to the selective operation of the pair of contactors disposed to directionally operate the tap changing transformer to adjust the voltage of the power system supplied thereby to correspond to the voltage of the other power system and prevent a flow of reactive power in the tie line therebetween.

6. In a system for limiting the flow of reactive power in a tie line connected between two power systems one of which is connected through a tap changing transformer to a high voltage power source, the combination comprising, means including low power conductors from the power systems for providing a pair of direct current control voltages constituting measures of the voltages of the two power systems, a vacuum tube having a conductivity dependent upon the differential of said pair of direct current control voltages, another tube having a pair of anode-cathode circuits disposed to be selectively rendered conducting depending upon the conductivity of said first tube, a pair of contactors disposed to be selectively operated depending upon the selective conductivity of the pair of anode-cathode circuits, time delay means associated with each of the contactors to prevent premature operation thereof, and a motor disposed for directional operation in response to the selective operation of the contactors to directionally operate the tap changing transformer to adjust the voltage of the power system supplied thereby to correspond to the voltage of the other power system and prevent a flow of reactive power in the tie line therebetween.

7. In a system for limiting the flow of reactive power in a tie line connected between two power systems one of which is connected through a tap changing transformer to a high voltage power source, the combination comprising, means including low power conductors from the power systems for providing a pair of low ampere direct current control voltages constituting measures of the voltages of the two power systems, a first vacuum tube having a control grid, means for connecting the control grid to be biased in response to the differential of said pair of control voltages to control the conductivity of said first vacuum tube, another tube having twin anodes, grids and a cathode, means connected in circuit relation with the grids of said another tube and responsive to the conductivity of said first vacuum tube for selectively controlling the conductivity of the twin anode-cathode circuits of said another tube, a pair of contactors disposed to be selectively operated depending upon the selective conductivity of the twin anode-cathode circuits of said another tube, time delay means associated with each of the contactors to prevent premature operation thereof, and means responsive to the selective operation of the pair of contactors disposed to directionally operate the tap changing transformer to adjust the voltage of the power system supplied thereby to correspond to the voltage of the other power system and prevent a flow of reactive power in the tie line therebetween.

ROBERT M. JOLLY.

REFERENCES CITED

The following references are of record in the file of this patent:

UNITED STATES PATENTS

| Number | Name | Date |
| --- | --- | --- |
| 2,323,716 | Lennox | July 6, 1943 |
| 2,473,457 | Tyson | June 14, 1949 |